Dec. 29, 1925.
W. J. GALARNEAU
MILK STRAINER
Filed Oct. 13, 1924
1,567,937
2 Sheets-Sheet 1
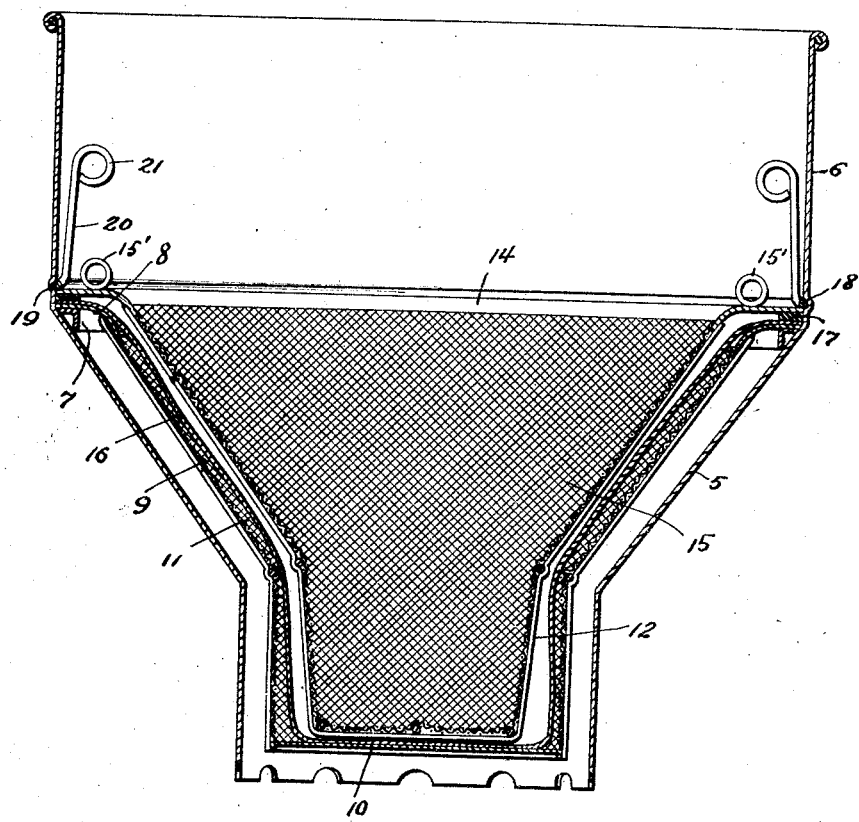
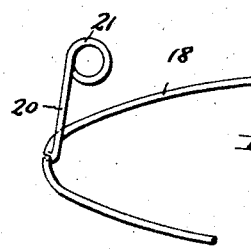
William J. Galarneau.
INVENTOR
BY Victor J. Evans
ATTORNEY
WITNESS:

Dec. 29, 1925.  
W. J. GALARNEAU  
MILK STRAINER  
Filed Oct. 13, 1924  
1,567,937  
2 Sheets-Sheet 2
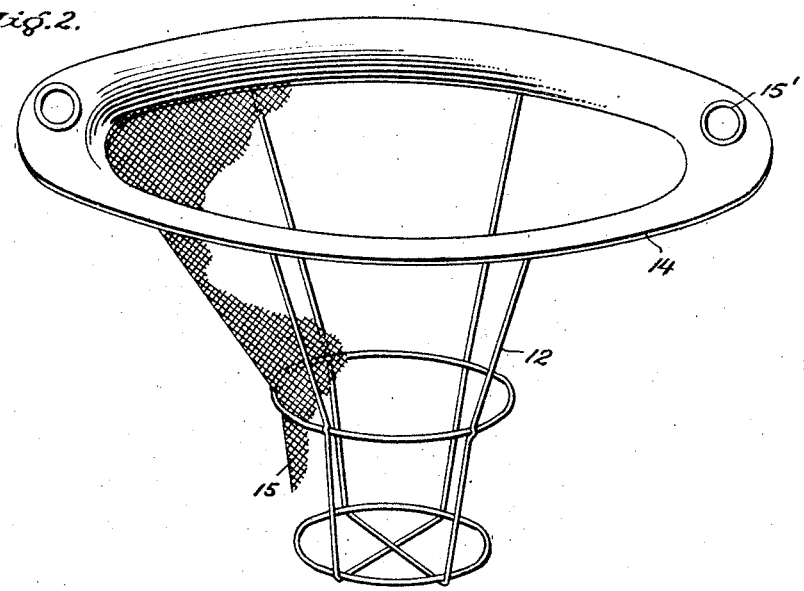
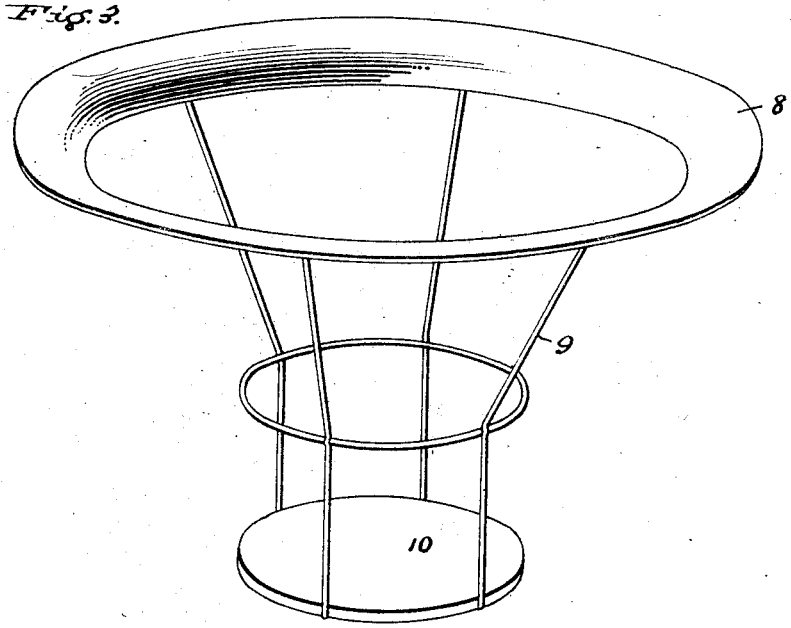
William J. Galarneau  
INVENTOR  
BY Victor J. Evans  
ATTORNEY
WITNESS: Gerald Hennessy Patented Dec. 29, 1925.

1,567,937

UNITED STATES PATENT OFFICE.

WILLIAM J. GALARNEAU, OF MOUNT VERNON, WASHINGTON.

MILK STRAINER.

Application filed October 13, 1924. Serial No. 743,447.

*To all whom it may concern:*

Be it known that I, WILLIAM J. GALARNEAU, a citizen of the United States of America, residing at Mount Vernon, in the county of Skagit and State of Washington, have invented new and useful Improvements in Milk Strainers, of which the following is a specification.

This invention relates to milk strainers and its principal object is to provide a strainer which will obviate the danger of the strainer being clogged with foreign matter.

Another object of the invention is to provide a milk strainer wherein the filtering or straining element is removable in order to permit the same to be cleansed.

Another object of the invention is to provide a milk strainer which will strain or cleanse the milk to a maximum degree and at the same time permit the liquid to pass through the strainer with a maximum degree of rapidity.

With the preceding and other objects and advantages in mind, the invention consists in the novel combination and arrangement of elements, construction and operations, to be hereinafter specifically referred to, claimed and illustrated in the accompanying drawings, wherein:

Figure 1 is a vertical sectional view of a milk strainer constructed in accordance with my invention.

Figure 2 is a perspective of one of the removable filtering elements embodied in the invention.

Figure 3 is a similar view of a cooperating removable filtering element embodied in the invention, and Figure 4 is a detail perspective of part of the invention.

Referring to the drawing in detail wherein correponding characters of reference denote corresponding parts throughout the several views, the numeral 5 designates a substantially frusto-conical funnel having a vertically extending annular flange 6 at its upper edge. Extending circumferentially about the inner face of the juncture of the funnel 5 and flange 6 is an L-shaped in cross section flange 7. Adapted to rest upon this flange 7 is a circular flange 8 carried by a frusto-conical shaped wire frame 9, the lower end of this frame 9 carrying a disk 10. Surrounding the frame 9 and attached to the flange 8 is a sheet of reticulated material such as wire gauze indicated at 11. Adapted for interfitting engagement with the frame 9 is a similar frame 12 having its lower end open and provided with a flange 14 and reticulated covering 15. Finger engaging elements 15 are carried by this flange 14 at diametrically opposite points whereby this frame 12 may be removed or applied in its operative position.

These frames 9 and 12 are arranged in spaced relation and disposed upon the inner faces of the reticulated element 11 is a strainer cloth 16 which completely surrounds the frame 12 and has its upper edge secured in position by means of a washer 17 interposed between the flange 15 and the flange 8.

In order to clamp the frames 9 and 12 in the funnel 5 there is provided a clamping ring 18 which resiliently engages an annular groove 19 formed upon the inner face of the flange 6 at a point in close proximity to the flange 14 of the frame 12. Vertical extensions 20 are formed with this ring 18 and terminate in finger engaging loops 21.

While I have shown and described the preferred embodiment of the invention, it is to be understood that changes in the arrangement of parts may be made and that I am only limited by the appended claim.

Having thus described the invention, I claim:

A funnel comprising an open ended casing, an annular flange surrounding the inner face thereof, a substantially frusto-conical wire frame removably arranged in the casing, an annular flange carried by the upper end of the frame and resting upon the flange first mentioned, a disk carried by the lower end of the frame, a foraminated element supported within the sides of the frame, a second frusto-conical frame received in the frame first mentioned and supported in spaced relation thereto, a foraminated element supported within the frame last mentioned, a resilient ring engaging the casing and adapted to clamp the frames therein, and extensions carried by the ring and terminating in finger engaging elements.

In testimony whereof I affix my signature.

WILLIAM J. GALARNEAU.